US008620859B2

(12) United States Patent
Penumatsa

(10) Patent No.: US 8,620,859 B2
(45) Date of Patent: Dec. 31, 2013

(54) DATA PROCESSING SYSTEM AND METHOD OF EVALUATING EFFECTIVENESS OF USAGE OF A FILE SYSTEM

(75) Inventor: Vamsi Penumatsa, Andhra Pradesh (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1287 days.

(21) Appl. No.: 12/136,075

(22) Filed: Jun. 10, 2008

(65) Prior Publication Data

US 2009/0271444 A1 Oct. 29, 2009

(30) Foreign Application Priority Data

Apr. 28, 2008 (IN) .......................... 1042/CHE/2008

(51) Int. Cl.
*G06F 7/00* (2006.01)
*G06F 17/00* (2006.01)

(52) U.S. Cl.
USPC .......................................... 707/609; 707/688

(58) Field of Classification Search
USPC ......... 707/609, 661, 662, 665, 667, 668, 687, 707/688, 694, 999.2
See application file for complete search history.

(56) References Cited

U.S. PATENT DOCUMENTS

| | | | | |
|---|---|---|---|---|
| 5,991,753 A * | 11/1999 | Wilde | ............... | 707/2 |
| 6,121,974 A * | 9/2000 | Shaw | ............. | 345/582 |
| 6,266,742 B1 * | 7/2001 | Challenger et al. | ........... | 711/133 |
| 6,487,638 B2 * | 11/2002 | Dawkins et al. | ............. | 711/133 |
| 7,124,272 B1 * | 10/2006 | Kennedy et al. | .............. | 711/173 |
| 7,206,778 B2 * | 4/2007 | Bode et al. | ........................ | 707/5 |
| 7,219,090 B2 * | 5/2007 | Travis, Jr. | ......................... | 707/3 |
| 7,346,622 B2 * | 3/2008 | Horvitz et al. | ................ | 707/100 |
| 7,539,706 B1 * | 5/2009 | Campbell | ..................... | 707/204 |
| 2007/0106710 A1 * | 5/2007 | Haustein et al. | .............. | 707/204 |
| 2008/0189470 A1 * | 8/2008 | Saika | ............................ | 711/100 |

\* cited by examiner

*Primary Examiner* — Marc Somers

(57) ABSTRACT

A method of evaluating effectiveness of usage of a file system by a plurality of files, comprising calculating a ratio A:S, wherein A is the sum of results of a function carried out in respect of each of the files, the result of the function in respect of a file being dependent on at least two properties of the file including the size of the file; and wherein S is the total size of the files.

24 Claims, 1 Drawing Sheet

| Access age group (days) | Directory A | | Directory B | |
|---|---|---|---|---|
| | Size of files (MB) | $\Sigma_j a_j s_j$ | Size of files (MB) | $\Sigma_j a_j s_j$ |
| 0-30 | 250 | 250 | 20 | 20 |
| 30-60 | 99 | 49.5 | 89 | 44.5 |
| 60-180 | 76 | 15.2 | 298 | 59.6 |
| 180-365 | 78 | 7.8 | 110 | 11 |
| 365+ | 64 | 0.64 | 230 | 2.3 |
| Totals | 567 | 323.14 | 747 | 137.4 |

300

| Access age group (days) | Directory A (size in MB) | Directory B (size in MB) |
|---|---|---|
| 0-30 | 250 | 20 |
| 30-60 | 99 | 89 |
| 60-180 | 76 | 298 |
| 180-365 | 78 | 110 |
| 365+ | 64 | 230 |

| Access age group (days) | Coefficient |
|---|---|
| 0-30 | 1 |
| 30-60 | 0.5 |
| 60-180 | 0.2 |
| 180-365 | 0.1 |
| 365+ | 0.01 |

| | Directory A | | Directory B | |
|---|---|---|---|---|
| Access age group (days) | Size of files (MB) | $\Sigma_j a_j s_j$ | Size of files (MB) | $\Sigma_j a_j s_j$ |
| 0-30 | 250 | 250 | 20 | 20 |
| 30-60 | 99 | 49.5 | 89 | 44.5 |
| 60-180 | 76 | 15.2 | 298 | 59.6 |
| 180-365 | 78 | 7.8 | 110 | 11 |
| 365+ | 64 | 0.64 | 230 | 2.3 |
| Totals | 567 | 323.14 | 747 | 137.4 |

DATA PROCESSING SYSTEM AND METHOD OF EVALUATING EFFECTIVENESS OF USAGE OF A FILE SYSTEM

RELATED APPLICATIONS

Benefit is claimed under 35 U.S.C. 119(a)-(d) to Foreign application Ser No. 1042/CHE/2008 entitled "DATA PROCESSING SYSTEM AND METHOD" by Hewlett-Packard Development Company, L.P., filed on 28th Apr. 2008, which is herein incorporated in its entirety by reference for all purposes.

BACKGROUND TO THE INVENTION

A file system in a data center may store a large amount of files and data. For example, the file system may store many petabytes of data and/or many millions of files. System administrators may use file system management software to manage the files. The management software may be used to generate reports on the files. For example, a report may comprise a table that indicates the amount of files that have been most recently accessed within certain time periods.

It is an object of embodiments of the invention to at least mitigate one or more of the problems of the prior art.

BRIEF DESCRIPTION OF THE DRAWINGS

Embodiments of the invention will now be described by way of example only, with reference to the accompanying figures, in which:

FIG. 1 shows an example of a management report generated by file system management software;

FIG. 2 shows an example of a table that embodies an organisation's policy according to embodiments of the invention; and FIG. 3 shows a table that includes values of $\Sigma_j a_j s_j$ according to embodiments of the invention.

DETAILED DESCRIPTION OF EMBODIMENTS OF THE INVENTION

FIG. 1 shows an example of a report from file system management software that comprises a table 100. The table 100 shows the total size of the files having their last access within certain age groups. The table 100 considers two groups of files. The first group of files comprises all of the files within directory A, and the second group of files comprises all of the files within directory B.

The table 100 shows, for example, that the first group of files (in directory A) includes 250 megabytes (MB) of files that have been accessed within the last 30 days and 99 MB of files that were last accessed between 30 and 60 days ago. Each entry for size may be as a result of, for example, a large number of small files, or a small number of large files, or a mixture.

However, the table 100 does not provide any information that indicates the effectiveness of utilisation by the files of the file system on which the files are stored. For example, consider that the first group of files may contain 250 MB of unimportant files that were recently accessed (for example, within the last 30 days) and 99 MB of important files that were not recently accessed (for example, were last accessed between 30 and 60 days ago). The first group of files in directory A does not utilise the file system effectively as it includes 250 MB of recently accessed unimportant files. However, the table 100 does not indicate that some of the files in the group do not utilise the file system effectively. Alternatively, for example, each entry in the table may indicate the total size of the files for that entry (for example, the total size of files in directory A that were last accessed over 365 days ago) but do not distinguish between, for example, important and unimportant files making up that total size. Important files may comprise files that are important to an organisation, such as, for example, files created by certain authors, files of certain types and/or files with other properties. Unimportant files may comprise files that are not important to an organisation. For example, unimportant files may comprise media type files, such as image, sound and video files.

Furthermore, the table 100 also does not provide a simple overview of the effectiveness of utilization of the file system. For example, the table 100 does not give a numerical representation of the effectiveness of usage of the file system by a plurality of files.

Embodiments of the invention may be used to evaluate the effectiveness of the usage of a file system by a plurality of files and to provide a numerical indication of the effectiveness. The numerical indication may be called the Effective Utilisation Index (EUI). A plurality of files may be all or some files within a file system, for example, a group of files comprising all files in a directory.

Embodiments of the invention provide a method of evaluating effectiveness of usage of a file system by a plurality of files, comprising calculating a ratio A:S. A is the sum of results of a function fna( ) carried out in respect of each of the files. In embodiments of the invention, the function fna( ) carried out in respect of one file returns a numerical value that is dependent on at least two properties of the file, including the size of the file. S is the total size of the plurality of files.

Therefore:

$$\text{Effective Utilisation Index, } EUI = \frac{A}{S} \quad (1)$$

If there are n files in the plurality of files, equation (1) becomes in embodiments of the invention:

$$EUI = \frac{\Sigma_j a_j s_j}{\Sigma_j s_j} \quad (2)$$

where:
$s_j$ is the size of file j, $1 \leq j \leq n$; and
$a_j$ is the result of a function fn( ) carried out in respect of file j.

The function fn( ) returns a result for file j that is dependent on at least one property of file j. The properties of the file j may include, for example, the age of the file, the time of last access of the file, the owner of the file, the type of the file and the content of the file.

Properties of the file may also include whether other properties of the file meet one or more criteria. An organisation may have policies that indicate files that effectively utilise the file system. For example, an organisation may have a policy that indicates that media type files are less important than other types of files such as text documents, and/or indicates that files that have last been accessed recently are more important than files where the last access is not recent. The policies specify criteria for files in the file system to meet, or specify rules for determining to what extent the files meet the criteria.

FIG. 2 shows, as an example, a table 200 of coefficients that are given to files with their last access within certain time periods. For example, as shown in the table 200, files that were last accessed less than 30 days ago are given the coefficient 1, whereas files that were last accessed between 60 and 180 days ago are given the coefficient 0.2. The table 200 may embody an organisation's policy to consider that files that were last accessed recently are more important than those files that were last accessed less recently. A criterion for this policy would be "a file must have been recently accessed". The coefficient in the table 200 that applies to a particular file is higher the more recently the file was last accessed, and so the table 200 provides rules for determining to what extent the file meets the criterion.

In this example, the function f( ) that provides the value $a_j$ for a file j returns the coefficient appropriate to that file from the table 200. For example, $a_j$ for a file j that was last accessed 99 days ago is 0.2. Therefore, $a_j$ is higher for files that have been accessed more recently, due to the selection of the coefficients in the table 200.

FIG. 3 shows a table 300 that includes the total $\Sigma_j a_j s_j$ for the files that are within the age groups shown (i.e. the files that have their last access within a certain range).

For example, the files that have their last access within the 30 to 60 days are given 49.5 for those files within directory A and 44.5 within directory B. However, the total $\Sigma_j a_j s_j$ for all of the files within directory A is 323.14 and for all the files within directory B is 137.4.

Therefore, using equation (2) above, for the plurality of files that comprises all the files in directory A:

$$EUI = \frac{323.14}{567} = 0.5699 \qquad (3)$$

And for the files in directory B:

$$EUI = \frac{137.4}{747} = 0.1839 \qquad (4)$$

Thus, the effective utilisation index (EUI) is a numerical value that indicates the effectiveness of usage of the file system by a plurality of files. In this example, the EUI is higher for a plurality of files that has a better utilisation of the file system, although embodiments of the invention may be realised where a lower EUI indicates better utilisation. Additionally or alternatively, an EUI for a plurality of files may take a negative value.

The effectiveness of the utilisation of the file system by the directories A and B can be considered as follows. The directory A contains files whereby a large amount of the total size of the files comprises files that have been recently accessed, and a small percentage of the total size comprises very old files (for example, those files that were last accessed over 365 days ago). In contrast, the directory B contains few recently accessed files, with most of the files having been accessed a relatively long time ago. Therefore, if the file system used by directories A and B is one that is designed for frequent access, the directory A can be said to utilise the file system more effectively than directory B. Therefore, the function fn( ) is chosen so that the EUI reflects the effectiveness of this utilisation. However, in another example, where the file system is an archive file system or one that is not designed to be accessed frequently, then the effectiveness of utilisation by directory B may be better than the effectiveness of utilisation of directory A. The function fn( ) returns appropriate values to reflect this effectiveness of utilisation.

In the example given above, the function fn( ) in respect of a file j returns a value $a_j$ that is dependent on only one property of the file, i.e. the time since the last access of that file. Therefore, the value of $fn( )=a_j s_j$ is dependent on two properties of the file, i.e. the time since the last access and the size of the file. However, in alternative embodiments, the value of fna( ) in respect of a file j may be dependent on three or more properties of the file.

The combined EUI value for n files and/or groups of files (for example, two or more folders containing files) can be determined from the EUI values of each of the groups of files using the following formula:

$$\text{Combined } EUI = \frac{\Sigma_i (EUI_i s_i)}{\Sigma_i s_i} \qquad (5)$$

where $EUI_i$ is the EUI of file or group i, and $s_i$ is the size of file group i, $1 \leq i \leq n$.

Embodiments of the invention may include the ability to perform or suggest file management operations to improve (for example, increase) the EUI value of a group of files, thus potentially improving utilisation of a file system storing those files. For example, as shown in FIG. 3, directory A includes a number of files that were last accessed over 180 days ago. If directory A is intended to store recently accessed files, then the EUI of directory A may be improved (i.e. increased) by moving the files over 180 days old, for example to an archive directory. Thus, the entries in table 300 under directory A for files over 180 days old would become zero for both size and $\Sigma_j a_j s_j$. The total size of files in directory A, $\Sigma_j s_j$, would become 425, and $\Sigma_j a_j s_j$ would become 314.7. Thus, the EUI of directory A would become:

$$EUI = \frac{314.7}{425} = 0.740 \qquad (6)$$

The value of EUI for directory A is thus increased compared to that determined in equation (3) above, thus indicating that the utilization of the file system by the files in directory A has been improved. In other situations, other file system operations may be more appropriate, including deleting certain files, moving certain types of files to other locations, and/or other file system operations.

It will be appreciated that embodiments of the present invention can be realised in the form of hardware, software or a combination of hardware and software. Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Versatile Disc (DVD), magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of evaluating effectiveness of usage of a file system by a plurality of files, the method comprising;
    calculating an index value, wherein calculating the index value comprises:
        calculating a numerical value of the ratio A:S, wherein A is the sum of results of a function carried out in respect of each of the files, the result of the function in respect of a file being dependent on at least two properties of the file including the size of the file; and wherein S is the total size of the files;
    determining, based on the calculated index value, file system operations to increase the index value of the plurality of files; and
    performing the determined file system operations.

2. A method as claimed in claim 1, wherein the properties of the file include whether the file meets one or more criteria.

3. A method as claimed in claim 1, wherein the properties of a file include at least one of the age of the file, the time of last access of the file, the owner of the file, the type of the file and the content of the file.

4. A method as claimed in claim 1, wherein calculating the numerical value of the ratio A:S comprises calculating:

$$\frac{\Sigma_j(a_j s_j)}{\Sigma_j s_j}$$

wherein $a_j s_j$ is the function carried out in respect of file j of the files, and $s_j$ is the size of file j.

5. A method as claimed in claim 1, comprising the step of providing, based on the numerical value of the ratio A:S, an indication of effective utilisation of the file system.

6. A method as claimed in claim 1, wherein the result of the function in respect of a file is dependent on at least three properties of the file.

7. A method as claimed in claim 1, wherein performing the determined file system operations includes suggesting to perform the determined file system operations prior to performing the determined file system operations.

8. A method as claimed in claim 1, comprising evaluating the effectiveness of usage of the file system by a plurality of files and/or groups of files, comprising calculating:

$$\frac{\Sigma_i(EUI_i s_i)}{\Sigma_i s_i}$$

where $EUI_i$ is the numerical value of the ratio A:S for a file or group of files i, and $s_i$ is the size of the file or group of files i.

9. A system for evaluating effectiveness of usage of a file system by a plurality of files, the system comprising:
    a processing resource in communication with a computer readable medium, wherein the computer readable medium contains a set of instructions and wherein the processing resource is designed to early out the set of instructions to:
        calculate an index value, wherein the index value comprises a calculated numerical value of the ratio A:S, wherein A is the sum of results of a function carried out in respect of each of the files, the result of the function in respect of a file being dependent on at least two properties of the file including the size of the file and wherein S is the total size of the files; and
        determine, based on the calculated index value, file system operations to increase the index value of the plurality of files; and
        performing the determined file system operations.

10. A system as claimed in claim 9, wherein the properties of the file include whether the file meets one or more criteria.

11. A system as claimed in claim 9, wherein the properties of a file include at least one of the age of the file, the time of last access of the file, the owner of the file, the type of the file and the content of the file.

12. A system as claimed in claim 9, wherein the set of instructions include instructions to cause the processor resource to calculate the numerical value of the ratio A:S by calculating:

$$\frac{\Sigma_j(a_j s_j)}{\Sigma_j s_j}$$

wherein $a_j s_j$ is the function carried out in respect of file j of the files, and $s_j$ is the size of file j.

13. A system as claimed in claim 9, wherein the set of instructions include instructions to cause the processor resource to provide, based on the numerical value of the ratio A:S, an indication of effective utilization of the file system.

14. A system as claimed in claim 9, wherein the result of the function in respect of a file is dependent on at least three properties of the file.

15. A system as claimed in claim 9, wherein the set of instructions to cause the processor resource to perform the determined file system operations includes instructions to suggest to perform the determined file system operations prior to the instructions to perform the determined file system operations.

16. A system as claimed in claim 9, wherein the set of instructions include instructions to cause the processor resource to evaluate the effectiveness of usage of the file system by a plurality of files and/or groups of files by calculating: 1, (EUI,s,)

$$\frac{\Sigma_i(EUI_i s_i)}{\Sigma_i s_i}$$

where $EUI_i$ is the numerical value of the ratio A:S for a file or group of files i, and $s_i$ is the size of the file or group of files i.

17. A non-transitory computer readable medium having instructions, when executed, for evaluating effectiveness of usage of a file system by a plurality of files, said instructions comprising instructions for:
  calculating an index value, wherein calculating the index value comprises:
    calculating a numerical value of the ratio A:S, wherein A is the sum of results of a function carried out in respect of each of the files, the result of the function in respect of a file being dependent on at least two properties of the file including the size of the file and wherein S is the total size of the files;
  determining, based on the calculated index value, file system operations to increase the index value of the plurality of files; and
  performing the determined file system operations.

18. A non-transitory computer readable medium as claimed in claim 17, wherein the properties of the file include whether the file meets one or more criteria.

19. A non-transitory computer readable medium as claimed in claim 17, wherein the properties of a file include at least one of the age of the file, the time of last access of the file, the owner of the file, the type of the file and the content of the file.

20. A non-transitory computer readable medium as claimed in claim 17, wherein the instructions for calculating the numerical value of the ratio A:S comprises instructions for calculating:

$$\frac{\Sigma_j(a_j s_j)}{\Sigma_j s_j}$$

wherein $a_j s_j$ is the function carried out in respect of file j of the files, and $s_j$ is the size of file j.

21. A non-transitory computer readable medium as claimed in claim 17, wherein a higher value of the numerical value of the ratio A:S indicates more effective utilization of the file system.

22. A non-transitory computer readable medium as claimed in claim 17, wherein the instructions for performing the determined file system operations includes instructions for suggesting to perform the determined file system operations prior to performing the determined file system operations.

23. A non-transitory computer readable medium as claimed in claim 17, comprising instructions for evaluating the effectiveness of usage of the file system by a plurality of files and/or groups of files, the instructions comprising instructions for calculating:

$$\frac{\Sigma_i(EUI_i s_i)}{\Sigma_i s_i}$$

where $EUI_i$ is the numerical value of the ratio A:S for a file or group of files i, and $s_i$ is the size of the file or group of files i.

24. A non-transitory computer readable medium as claimed in claim 17, wherein the result of the function in respect of a file is dependent on at least three properties of the file.

* * * * *